United States Patent
Hayata et al.

(10) Patent No.: US 8,608,305 B2
(45) Date of Patent: Dec. 17, 2013

(54) INKJET INK COMPOSITION AND INKJET RECORDING METHOD

(75) Inventors: Yuuichi Hayata, Ashigarakami-gun (JP); Yasuhito Oshima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

(21) Appl. No.: 13/006,256

(22) Filed: Jan. 13, 2011

(65) Prior Publication Data

US 2011/0169903 A1  Jul. 14, 2011

(30) Foreign Application Priority Data

Jan. 14, 2010  (JP) .................................. 2010-005443

(51) Int. Cl.
*B41J 2/01* (2006.01)

(52) U.S. Cl.
USPC ............................................. 347/100; 347/95

(58) Field of Classification Search
USPC ........... 347/100, 95, 96, 101, 102, 99, 88, 21, 347/20, 9; 106/31.6, 31.13, 31.27; 523/160, 523/161
See application file for complete search history.

(56) References Cited

U.S. PATENT DOCUMENTS

| | | | |
|---|---|---|---|
| 2008/0008966 A1* | 1/2008 | Hayata et al. | 106/31.13 |
| 2008/0074480 A1* | 3/2008 | Tojo et al. | 347/100 |
| 2008/0286484 A1* | 11/2008 | Tojo et al. | 427/511 |
| 2008/0316244 A1* | 12/2008 | Lugassi et al. | 347/102 |
| 2009/0087626 A1* | 4/2009 | Hayata et al. | 428/195.1 |
| 2009/0202795 A1* | 8/2009 | Hayata et al. | 428/195.1 |
| 2009/0318580 A1* | 12/2009 | Nakano et al. | 522/148 |

FOREIGN PATENT DOCUMENTS

| | | |
|---|---|---|
| JP | 2007-262178 A | 10/2007 |
| JP | 2009-035650 A | 2/2009 |
| JP | 2009-197194 A | 9/2009 |

OTHER PUBLICATIONS

Japanese Office Action received Jun. 4, 2013 in counterpart JP 2010-005443.

* cited by examiner

*Primary Examiner* — Manish S Shah
(74) *Attorney, Agent, or Firm* — Sughrue Mion, PLLC

(57) ABSTRACT

An inkjet ink composition is provided that includes (Component A) an N-vinyllactam, (Component B) a compound represented by Formula (B), and (Component C) a di(meth) acrylate ester of a hydrocarbon diol having 6 to 18 carbon atoms

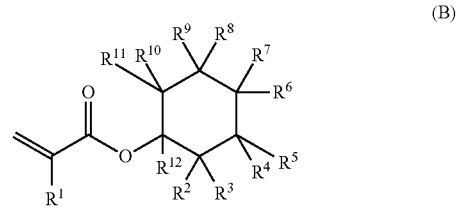

(B)

wherein $R^1$ denotes a hydrogen atom or a methyl group, and $R^2$ to $R^{12}$ independently denote a hydrogen atom or an alkyl group having 1 to 10 carbon atoms.

There is also provided an inkjet recording method that includes (a) an image formation step of forming an image above a support by discharging the inkjet ink composition by an inkjet method and (b) a curing step of curing the inkjet ink composition by irradiating the obtained image with actinic radiation to thus obtain a printed material having a cured image above the support.

20 Claims, No Drawings

INKJET INK COMPOSITION AND INKJET RECORDING METHOD

BACKGROUND OF THE INVENTION

1. Field of the Invention

The present invention relates to an inkjet ink composition and an inkjet recording method.

2. Description of the Related Art

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays. Examples of conventional ink composition for inkjet recording are described in JP-A-2007-262178 and JP-A-2009-35650 (JP-A denotes a Japanese unexamined patent application publication).

BRIEF SUMMARY OF THE INVENTION

Problems to be Solved by the Invention

It is an object of the present invention to provide an inkjet ink composition that has excellent curability and gives an image free from stripe unevenness and having excellent surface gloss and flexibility, and an inkjet recording method.

Means for Solving the Problems

The above-mentioned object of the present invention has been achieved by means described below.

(1) An inkjet ink composition comprising (Component A) an N-vinyllactam, (Component B) a compound represented by Formula (B); and, (Component C) a di(meth)acrylate ester of a hydrocarbon diol having 6 to 18 carbon atoms (B)

wherein $R^1$ denotes a hydrogen atom or a methyl group, and $R^2$ to $R^{12}$ independently denote a hydrogen atom or an alkyl group having 1 to 10 carbon atoms, (2) the inkjet ink composition according to (1), wherein it comprises an α-hydroxy ketone compound and/or a monoacylphosphine oxide compound as (Component D) a polymerization initiator, (3) the inkjet ink composition according to (1), wherein Component A above is N-vinylcaprolactam, (4) the inkjet ink composition according to (1), wherein Component A above has a content of at least 8 wt % but no greater than 40 wt % relative to the total weight of the ink composition, (5) the inkjet ink composition according to (1), wherein Component B above is 4-t-butylcyclohexyl (meth)acrylate and/or 3,3,5-trimethylcyclohexyl (meth)acrylate, (6) the inkjet ink composition according to (1), wherein Component B above has a content of at least 10 wt % but no greater than 45 wt % relative to the total weight of the ink composition, (7) the inkjet ink composition according to (1), wherein the hydrocarbon diol is at least one type of diol selected from the group consisting of a straight-chain hydrocarbon diol having 9 to 18 carbon atoms, a branched hydrocarbon diol having 6 to 18 carbon atoms, and a cyclic hydrocarbon diol having 6 to 18 carbon atoms, (8) the inkjet ink composition according to (1), wherein Component C above has a content of at least 10 wt % but no greater than 45 wt % relative to the total weight of the ink composition, (9) the inkjet ink composition according to (1), wherein it comprises neither a silicone-based surfactant nor a fluorine-based surfactant or comprises a total content of silicone-based and fluorine-based surfactants of greater than 0 wt % but no greater than 0.01 wt % relative to the total weight of the ink composition,

(10) the inkjet ink composition according to (1), wherein of ethylenically unsaturated compounds contained in the ink composition, at least 70 wt % are compounds having no ether bond,

(11) the inkjet ink composition according to (1), wherein Component A above is an N-vinyllactam represented by Formula (A)

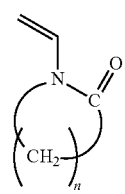

(A)

wherein n denotes an integer of 2 to 6,

(12) the inkjet ink composition according to (1), wherein Component A above is N-vinylcaprolactam, Component B above is 4-t-butylcyclohexyl (meth)acrylate and/or 3,3,5-trimethylcyclohexyl (meth)acrylate, and Component C above is at least one type of diol selected from the group consisting of a straight-chain hydrocarbon diol having 9 to 18 carbon atoms, a branched hydrocarbon diol having 6 to 18 carbon atoms, and a cyclic hydrocarbon diol having 6 to 18 carbon atoms,

(13) the inkjet ink composition according to (12), wherein the sum total of the contents of Component B above and Component C above is at least 25 wt % but no greater than 75 wt % relative to the total weight of the ink composition,

(14) the inkjet ink composition according to (12), wherein it comprises an a-hydroxyketone compound and/or a monoacylphosphine oxide compound as (Component D) a polymerization initiator,

(15) the inkjet ink composition according to (1), wherein Component A above is N-vinylcaprolactam, Component B above is 4-t-butylcyclohexyl (meth)acrylate and/or 3,3,5-trimethylcyclohexyl (meth)acrylate, Component C above is at least one type of diol selected from the group consisting of a straight-chain hydrocarbon diol having 9 to 18 carbon atoms, a branched hydrocarbon diol having 6 to 18 carbon atoms, and a cyclic hydrocarbon diol having 6 to 18 carbon atoms, and the ink composition comprises neither a silicone-based surfactant nor a fluorine-based surfactant or comprises a total content of silicone-based and fluorine-based surfactants of greater than 0 wt % but no greater than 0.1 wt % relative to the total weight of the ink composition,

(16) an image inkjet recording method comprising (a) an image formation step of forming an image above a support by discharging the inkjet ink composition according to (1) by an inkjet method; and (b) a curing step of curing the inkjet ink composition by irradiating the obtained image with actinic radiation to thus obtain a printed material having a cured image above the support,

(17) the inkjet recording method according to (16), wherein at least part of the image in the printed material is formed by repeating the image formation step and the curing step two or more times.

Effect of the Invention

In accordance with the present invention, there can be provided an inkjet ink composition that has excellent curability and gives an image free from stripe unevenness and having excellent surface gloss and flexibility, and an inkjet recording method.

Mode for Carrying Out the Invention

I. Inkjet Ink Composition

An inkjet ink composition (hereinafter, also simply called an 'ink composition') of the present invention comprises (Component A) N-vinyllactam, (Component B) compounds represented by Formula (B), and (Component C) (meth) acrylic ester having 6 to 18 carbon atoms

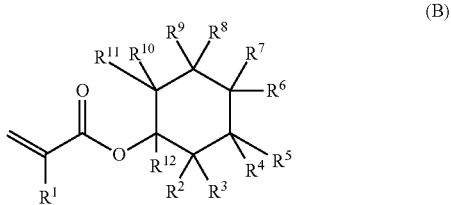

wherein $R^1$ denotes a hydrogen atom or a methyl group, and $R^2$ to $R^{12}$ independently denote a hydrogen atom or an alkyl group having 1 to 10 carbon atoms.

In the present specification, description 'A to B', which indicates a numerical value range, means 'at least A but no greater than B'.

The ink composition of the present invention is an oil-based ink composition that is curable upon exposure to actinic radiation.

The 'actinic radiation' referred to in the present invention is radiation that can provide energy that enables an initiating species to be generated in the ink composition when irradiated, includes α rays, γ rays, X rays, ultraviolet rays, visible light, and an electron beam. Among these, ultraviolet rays and an electron beam are preferable from the viewpoint of curing sensitivity and the availability of equipment, and ultraviolet rays are more preferable.

It is said that, compared with a printed material obtained by aqueous inkjet printing or solvent inkjet printing, in the case of a printed material obtained by actinic radiation-curing type inkjet printing a cured film has low surface gloss and marked stripe unevenness. It is thought that one of main causes therefor is the shape of a fired droplet when landing being retained since the fired droplet is cured by actinic radiation immediately after landing of the inkjet.

On the other hand, the ink composition of the present invention gives an inkjet image that has excellent printed material surface gloss and little stripe unevenness. Although the reason therefor is not certain, the discharged ink composition comprising Component A to Component C cures from an inner part of a fired droplet by irradiation with actinic radiation immediately after landing. On the other hand, by the effect of Component C in particular, which is expected to have a high dissolved oxygen content, only the fired droplet outermost surface, which is in contact with the air, is selectively subjected to oxygen polymerization inhibition, the outermost surface of the fired droplet is kept in a liquid state for a long period of time, the fired droplet outermost surface spreads while wet, and coalescing is promoted. It is surmised that, as a result, a smoother level surface is formed and an image having a high degree of surface gloss and little stripe unevenness is obtained. When printing in a multipass mode in which the same area is printed by overstriking, there is a case in which a fired droplet is overlayered on a previously fired liquid droplet during overstriking. In this process, if the outermost surface of the ink film of the previously fired droplet is in a liquid state, the degree of spreading while wet of the subsequently fired droplet increases, and higher surface gloss is obtained.

When controlling the cured state of a fired droplet, it is important to maintain only the very outermost surface of the fired droplet in a liquid state. If the interior of the fired droplet is kept in a liquid state for a long period of time, a final printed material might become tacky, or a subsequently fired droplet might enter the film interior when overstriking, thus forming a crater-like recess in a printed material. As a result, the smoothness of a printed material surface might be undesirably lost. Furthermore, it is thought that low curability of the interior might cause interference between fired droplets (the position of fired droplets being displaced due to overlapping of the fired droplets), thus accentuating stripe unevenness.

It is though that, in accordance with the present invention, since the combination of Component A to Component C makes it possible to selectively maintain only the cured film outermost surface in a liquid state for a long period of time while strongly promoting the curability of the interior of a fired droplet, a printed material having high surface gloss and little stripe unevenness is obtained.

(Component A) N-vinyllactam

The ink composition of the present invention comprises (Component A) N-vinyllactam. N-vinyllactam is preferably a compound represented by Formula (A).

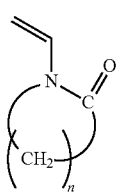

(A)

In Formula (A), n denotes an integer of 2 to 6; n is preferably an integer of 2 to 5 from the viewpoint of flexibility after the ink composition is cured, adhesion to a recording medium, and ready availability of starting materials, n is more preferably 2 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group in place of a hydrogen atom on the lactam ring, and may have a saturated or unsaturated ring structure bonded to the lactam ring.

Component A may be used singly or in a combination of two or more compounds.

The content of Component A is, relative to the total weight of the ink composition, preferably 8 to 40 wt %, more preferably 8 to 35 wt %, yet more preferably 12 to 32 wt %, and particularly preferably 14 to 25 wt %. When in the above-mentioned range, the cured film outermost surface alone can be selectively maintained in a liquid state for a long period of time while strongly promoting the curability of the interior of the image, and a printed material having high surface gloss and little stripe unevenness is obtained.

(Component B) Compound Represented by Formula (B)

The ink composition of the present invention comprises (Component B) a compound represented by Formula (B). Due to Component B being contained, a cured film having excellent surface gloss, little tackiness, and excellent flexibility is obtained. Although the reason therefor is not certain, it is thought that due to Component B, which has a specific rigid cyclic structure, being contained, a high modulus of elasticity of the interior of the film can be maintained immediately after the ink composition starts curing, the curability of the interior of the ink is improved, and as a result a cured film having excellent surface gloss is obtained.

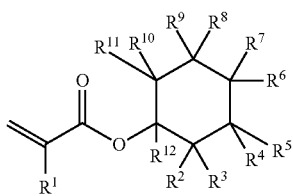

(B)

In Formula (B), $R^1$ denotes a hydrogen atom or a methyl group, and $R^2$ to $R^{12}$ independently denote a hydrogen atom or an alkyl group having 1 to 10 carbon atoms.

$R^1$ denotes a hydrogen atom or a methyl group, and from the viewpoint of excellent curability being obtained, it is preferably a hydrogen atom.

$R^2$ to $R^{12}$ independently denote a hydrogen atom or an alkyl group. The alkyl group is preferably a straight-chain or branched alkyl group having 1 to 10 carbon atoms, more preferably a straight-chain or branched alkyl group having 1 to 6 carbon atoms, and yet more preferably a methyl group or a t-butyl group. It is preferable that at least one of $R^2$ to $R^{12}$ is an alkyl group, it is more preferable that 1 to 5 thereof are alkyl groups, and it is yet more preferable that 1 to 3 thereof are alkyl groups.

Specific examples of Component B include 4-t-butylcyclohexyl (meth)acrylate, cyclohexyl (meth)acrylate, and 3,3,5-trimethylcyclohexyl (meth)acrylate; among them 4-t-butylcyclohexyl (meth)acrylate and/or 3,3,5-trimethylcyclohexyl (meth)acrylate are preferable, and 3,3,5-trimethylcyclohexyl (meth)acrylate is particularly preferable.

From the viewpoint of a printed material having excellent surface gloss, little cured film tackiness, and high flexibility being obtained, the content of Component B relative to the total weight of the ink composition is preferably 10 to 45 wt %, more preferably 15 to 40 wt %, and yet more preferably 20 to 35 wt %.

(Component C) Di(meth)acrylate Ester of Hydrocarbon Diol Having 6 to 18 Carbon Atoms The ink composition of the present invention comprises (Component C) a di(meth)acrylate ester of a hydrocarbon diol having 6 to 18 carbon atoms. Due to Component C being contained, a film having excellent surface gloss and little cured film tackiness is obtained.

The hydrocarbon diol is preferably at least one type of diol selected from the group consisting of a straight-chain hydrocarbon diol having 9 to 18 carbon atoms, a branched hydrocarbon diol having 6 to 18 carbon atoms, and a cyclic hydrocarbon diol having 6 to 18 carbon atoms. That is, Component C is preferably Component C-1 to Component C-3 below.

(Component C-1) Di(meth)acrylate Ester of Straight-chain Hydrocarbon Diol Having 9 to 18 Carbon Atoms Component C is preferably (Component C-1) a di(meth)acrylate ester of a straight-chain hydrocarbon diol having 9 to 18 carbon atoms. The number of carbon atoms of the straight-chain hydrocarbon diol is preferably 10 to 16, and more preferably 10 to 12.

Preferred examples of Component C-1 include nonanediol di(meth)acrylate, decanediol di(meth)acrylate, dodecanediol di(meth)acrylate, tridecanediol di(meth)acrylate, and octadecanediol di(meth)acrylate; an acrylate compound is preferable, decanediol diacrylate and dodecanediol diacrylate are more preferable, and decanediol diacrylate is particularly preferable.

(Component C-2) Di(meth)acrylate Ester of Branched Hydrocarbon Diol Having 6 to 18 Carbon Atoms Component C is preferably (Component C-2) a di(meth)acrylate ester of a branched hydrocarbon diol having 6 to 18 carbon atoms. The number of carbon atoms of the branched hydrocarbon diol is preferably 6 to 12, and more preferably 6 to 8.

The branched hydrocarbon diol preferably does not contain an unsaturated bond. The number of carbon atoms of the straight chain connecting the hydroxy groups in the branched hydrocarbon diol is preferably 3 to 5. The alkyl group branching from the straight chain preferably has 1 to 4 carbon atoms, and is more preferably a methyl group. The number of branches is preferably 1 or 2, and more preferably 1.

Preferred examples of Component C-2 include 3-methyl-1,5-pentanediol di(meth)acrylate and 2-n-butyl-2-ethyl-1,3-propanediol diacrylate; 3-methyl-1,5-pentanediol diacrylate is preferable.

(Component C-3) Di(meth)acrylate Ester of Cyclic Hydrocarbon Diol Having 6 to 18 Carbon Atoms Component C is preferably (Component C-3) a di(meth)acrylate ester of a cyclic hydrocarbon diol having 6 to 18 carbon atoms. The number of carbon atoms of the cyclic hydrocarbon diol is preferably 6 to 12, and more preferably 6 to 10.

The cyclic hydrocarbon diol is preferably one having only one cyclic hydrocarbon group. The cyclic hydrocarbon group is preferably an monoalicyclic group that does not contain an unsaturated bond or a bridged ring structure. The cyclic hydrocarbon group is preferably a cycloalkylene group, and the number of carbon atoms forming the cycloalkylene group is preferably 3 to 12, more preferably 4 to 10, and yet more preferably 5 to 8.

The hydroxy groups and the cyclic hydrocarbon group of the cyclic hydrocarbon diol are bonded directly or via a divalent linking group; the linking group is preferably an alkylene group having 1 to 5 carbon atoms, more preferably an alkylene group having 1 to 3 carbon atoms, and yet more preferably a methylene group.

Preferred examples of Component C-3 include cyclohexanedimethanol di(meth)acrylate, and tricyclodecanedimethanol di(meth)acrylate; cyclohexanedimethanol diacrylate is more preferable.

Among Component C-1 to Component C-3, it is preferable for (Component C-1) a di(meth)acrylate ester of a straight-chain hydrocarbon diol having 9 to 18 carbon atoms and/or (Component C-2) a di(meth)acrylate ester of a branched hydrocarbon diol having 6 to 18 carbon atoms to be contained, and it is most preferable for (Component C-2) a di(meth)acrylate ester of a branched hydrocarbon diol having 6 to 18 carbon atoms to be contained.

It is also preferable to use at least one selected from (Component C-1) a di(meth)acrylate ester of a straight-chain hydrocarbon diol having 9 to 18 carbon atoms and (Component C-2) a di(meth)acrylate ester of a branched hydrocarbon diol having 6 to 18 carbon atoms in combination with at least one of (Component C-3) a di(meth)acrylate ester of a cyclic hydrocarbon diol having 6 to 18 carbon atoms. In accordance with the above-mentioned combination, an ink composition that gives excellent surface gloss, excellent cured film tackiness, and excellent cured film flexibility is obtained.

The ratio by weight of (Component C-1) a di(meth)acrylate ester of a straight-chain hydrocarbon diol having 9 to 18 carbon atoms and/or (Component C-2) a di(meth)acrylate ester of a branched hydrocarbon diol having 6 to 18 carbon atoms to (Component C-3) a di(meth)acrylate ester of a cyclic hydrocarbon diol having 6 to 18 carbon atoms is preferably 6:1 to 1:2, and more preferably 5:1 to 1:1.

From the viewpoint of curability and flexibility, the content of Component C is, relative to the total weight of the ink composition, preferably 10 to 45 wt %, more preferably 15 to 35 wt %, and yet more preferably 20 to 30 wt %.

From the viewpoint of improvement of surface gloss and suppression of stripe unevenness, among monomers contained in the ink composition of the present invention, the content of Component A to Component C is preferably at least 70 wt %, more preferably 75 to 98 wt %, and yet more preferably 80 to 95 wt %.

Furthermore, from the viewpoint of obtaining water resistance and weather resistance by increasing hydrophobicity, the combined content of Component B and Component C in the ink composition is preferably 25 to 75 wt %, more preferably 30 to 70 wt %, yet more preferably 35 to 68 wt %, and particularly preferably 40 to 65 wt %.

Other Polymerizable Compound

The ink composition of the present invention may comprise a polymerizable compound other than Component A to Component C.

As the other polymerizable compound, a known polymerizable compound may be used, and examples thereof include a (meth)acrylate compound other than (Component A) to (Component C), a vinyl ether compound, an allyl compound, an N-vinyl compound, and an unsaturated carboxylic acid. Examples thereof include radically polymerizable monomers described in JP-A-2009-221414, polymerizable compounds described in JP-A-2009-209289, and ethylenically unsaturated compounds described in JP-A-2009-191183.

When a polymerizable compound other than Component A to Component C is added, from the viewpoint of obtaining excellent surface gloss it is preferable for the ink composition to contain as little as possible of a polymerizable compound having an ether bond (ethereal oxygen atom). It is preferable that a compound having an ether bond is not contained or is less than 30 wt % if one is contained. That is, the proportion of polymerizable compounds having no ether bond including Component A to Component C in the ink composition of the present invention is, relative to the total weight of the polymerizable compounds, preferably 70 to 100 wt %, more preferably 75 to 100 wt %, and yet more preferably 80 to 100 wt %.

(Component D) Polymerization Initiator

The ink composition of the present invention preferably comprises (Component D) Polymerization initiator. The polymerization initiator is a compound that forms a polymerization initiating species by absorbing external energy such as above-mentioned actinic radiation. The polymerization initiator may be used singly or in a combination of two or more compounds.

Examples of the polymerization initiator that can be used in the present invention include an aromatic ketone, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon-halogen bond. The specific example of these polymerization initiators is the radical polymerization initiator described in JP-A-2008-208190. Among these, preferred polymerization initiator that can be used in the present invention are an aromatic ketone and an acylphosphine compound.

The aromatic ketone is preferably an α-hydroxyketone, and examples thereof include 1-[4-(2-hydroxyethoxy)phenyl]-2-hydroxy-2-methyl-1-propan-1-one, 2-hydroxy-2-methyl-1-phenyl-propan-1-one, among them, 1-hydroxycyclohexyl phenyl ketone. Among them, 1-hydroxycyclohexyl phenyl ketone compound is preferable. The 1-hydroxycyclohexyl phenyl ketone compound referred to in the present invention comprises a compound obtained by substituting 1-hydroxycyclohexyl phenyl ketone with any substituent. The substituent may be selected freely from a range that enables an ability as a radical polymerization initiator to be exhibited, and specific examples thereof include an alkyl group having 1 to 4 carbons.

Preferred examples of the acylphosphine compound include acylphosphine oxide compounds described in JP-A-2008-208190. and among them a monoacylphosphine oxide compound is more preferable.

Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bis-diphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethyl hexanoyldiphenylphosphine oxide, 1-methylcyclohexanoyldiphenylphosphine oxide, methyl pivaloylphenylphosphinate, isopropyl pivaloylphenylphosphinate and 2,4,6-trimethylbenoyldiphenylphosphine oxide, and among them, 2,4,6-trimethylbenoyldiphenylphosphine oxide is preferable.

The ink composition of the present invention preferably comprises α-hydroxyketone compound and/or monoacylphosphine oxide compound. From the viewpoint of the curability and the anti-blocking properties, the combination of α-hydroxyketone compound and monoacylphosphine oxide compound is more preferable.

In the present invention, from the viewpoint of the curability and the uniformity of the curing in the cured film, the total amount of polymerization initiator used is preferably 0.01 to 35 wt % relative to the total amount of polymerizable compound, more preferably 0.5 to 20 wt %, and yet more preferably 1.0 to 15 wt %.

Furthermore, when a sensitizer is used, the total amount of polymerization initiator used is preferably 200:1 to 1:200 relative to the sensitizer as a ratio by weight of polymerization initiator: sensitizer, more preferably 50:1 to 1:50, and yet more preferably 20:1 to 1:5.

Preferred examples of sensitizer include a thioxanthone compound and a thiochromanone compound.

The thioxanthone compound is not particularly limited; a known compound may be used, and a compound represented by Formula (C-2) below is preferable.

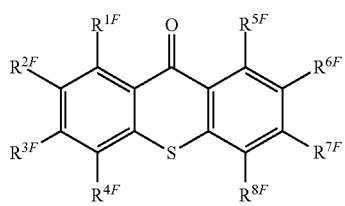

(C-2)

In Formula (C-2) above, $R^{1F}$, $R^{2F}$, $R^{3F}$, $R^{4F}$, $R^{5F}$, $R^{6F}$, $R^{7F}$, and $R^{8F}$ independently denote a hydrogen atom, an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group. The number of carbon atoms of an alkyl moiety in the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1F}$, $R^{2F}$, $R^{3F}$, $R^{4F}$, $R^{5F}$, $R^{6F}$, $R^{7F}$, and $R^{8F}$ that are adjacent may be joined to each other to form a ring. When they form a ring, examples of the ring structure include a 5- or 6-membered aliphatic or aromatic ring; it may be a heterocyclic ring containing an element other than a carbon atom, and rings thus formed may be further combined to form a bicyclic ring, for example a fused ring. These ring structures may further have a substituent. Examples of the substituent include a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group. Examples of a heteroatom when the resulting ring structure is a heterocyclic ring include N, O, and S.

Examples of the thioxanthone compound include thioxanthone, 2-isopropylthioxanthone, 4-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboxylmide, N-(1,1,3,3-tetramethylbutyl)thioxanthone-3,4-dicarboxylmide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride. Among them, from the viewpoint of ready availability and curability, thioxanthone, 2,3-diethylthioxanthone, 2,4-diethylthioxanthone, 2,4-dichlorothioxanthone, 1-chloro-4-propoxythioxanthone, 2-cyclohexylthioxanthone, 4-cyclohexylthioxanthone, 2-isopropylthioxanthone, and 4-isopropylthioxanthone are preferable, and 2-isopropylthioxanthone and 4-isopropylthioxanthone are more preferable.

The thiochromanone compound is not particularly limited; a known compound may be used, and a compound represented by Formula (C-3) below is preferable.

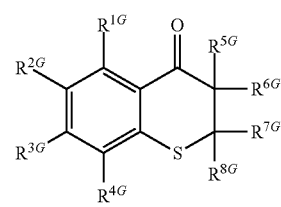

(C-3)

In Formula (C-3), $R^{1G}$, $R^{2G}$, $R^{3G}$, $R^{4G}$, $R^{5G}$, $R^{6G}$, $R^{7G}$, and $R^{8G}$ independently denote a hydrogen atom, an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group. The number of carbon atoms of an alkyl moiety of the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1G}$, $R^{2G}$, $R^{3G}$, and $R^{4G}$ that are adjacent may be bonded to each other, for example fused, to form a ring.

Examples of the ring structure when those above form a ring include a 5 or 6-membered aliphatic ring or aromatic ring; it may be a heterocyclic ring containing an element other than a carbon atom, and rings thus formed may be further combined to form a bicyclic ring, for example a fused ring. These ring structures may further have a substituent. Examples of the substituent include those described for Formula (C-2). Examples of a heteroatom when the resulting ring structure is a heterocyclic ring include N, O, and S.

Furthermore, the thiochromanone compound is preferably a compound having on the thiochromanone ring structure at least one substituent (a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, a sulfo group, etc.).

The specific examples of the thiochromanone compound preferably include (I-1) to (I-31) listed below. Among them, (I-14) is particularly preferable.

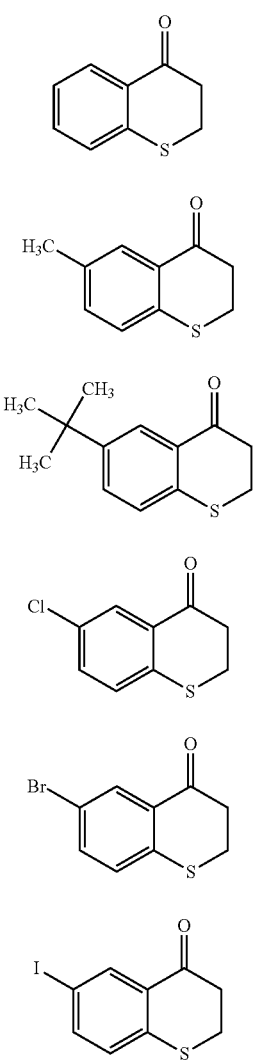

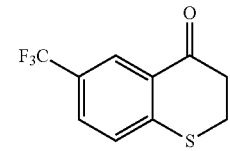
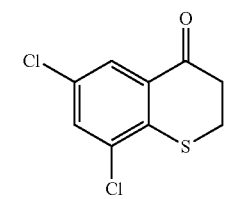
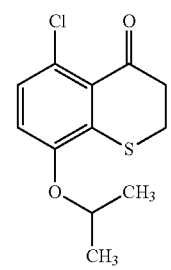
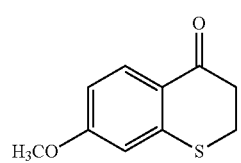
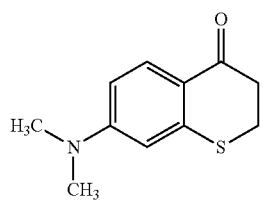
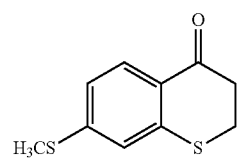
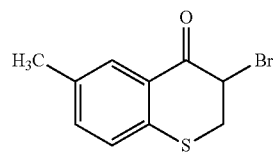
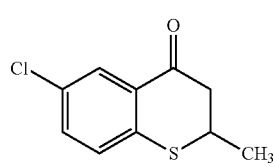

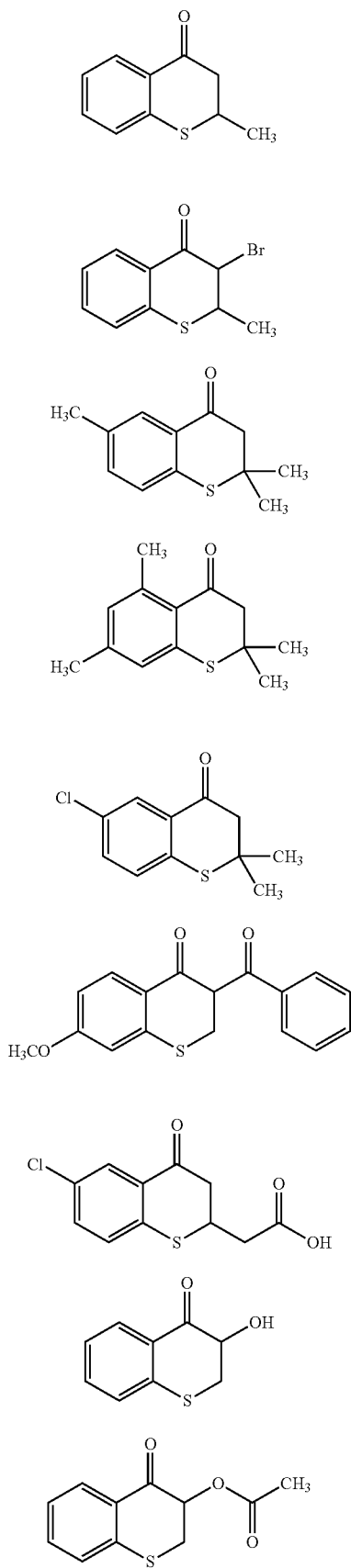
(Component E) Surfactant
The ink composition that can be used in the present invention may have a surfactant added for imparting stable discharge properties over a long period of time.

From the viewpoint of surface gloss and suppression of stripe unevenness, it is preferable that the ink composition of the present invention comprises neither a silicone-based surfactant nor a fluorine-based surfactant or comprises a total content of silicone-based and fluorine-based surfactants, relative to the total weight of the ink composition, of greater than 0 wt % but no greater than 0.1 wt %, and preferably greater than 0 wt % but no greater than 0.05 wt %.

As a surfactant other than silicone-based and fluorine-based surfactants, those described in JP-A-62-173463 and JP-A-62-183457 can be cited. Examples thereof include an anionic surfactant such as a dialkyl sulfosuccinate salt, an alkylnaphthalene sulfonic acid salt, or a fatty acid salt, a nonionic surfactant such as a polyoxyethylene alkyl ether, a polyoxyethylene alkyl allyl ether, an acetylene glycol, or a polyoxyethylene-polyoxypropylene block copolymer, and a cationic surfactant such as an alkylamine salt or a quaternary ammonium salt.

(Component F) Colorant

In the present invention, the ink composition may preferably contain a colorant in order to improve the visibility of a formed image area.

The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

It is preferable that the colorant is added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable compound. As a polymerizable compound used, it is preferable in terms of dispersion suitability to select a monomer having the lowest viscosity.

The colorants may be used by appropriately selecting one type or two or more types according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the transparency, and the curing sensitivity can be maintained.

The content of the colorant in the ink composition is appropriately selected according to the color and the intended purpose, and is preferably 0.01 to 30 wt % relative to the weight of the entire ink composition.

(Component G) Dispersant

The ink composition of the present invention preferably comprises a dispersant. Especially, when the pigment is used, the ink composition preferably comprises a dispersant in order to stably disperse the pigment in the ink composition.

As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), lonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 wt % relative to the weight of the entire ink composition.

(Component H) Oligomer

The ink composition of the present invention preferably comprises an oligomer.

An oligomer is generally a polymer in which a limited number (usually 5 to 100) of monomers are bonded, and known compounds called oligomers may be selected freely, but in the present invention it is preferable to select a polymer having a weight-average molecular weight of 400 to 10,000 (more preferably 500 to 5,000).

The oligomer may have a radically polymerizable group. The radically polymerizable group is preferably an ethylenically unsaturated group, and more preferably a (meth)acryloxy group.

The oligomer in the present invention may be any oligomer, and examples thereof include an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylimine, etc.), an addition-polymerization type oligomer (an oligoester acrylate, a polyamide oligomer, a polyisocyanate oligomer), and an addition-condensation oligomer (a phenolic resin, an amino resin, a xylene resin, a ketone resin, etc.). Among them an oligoester (meth)acrylate is preferable, and among them a urethane (meth)acrylate, a polyester (meth)acrylate, and an epoxy (meth)acrylate are preferable, and a urethane (meth)acrylate is more preferable.

As the urethane (meth)acrylate, an aliphatic urethane (meth)acrylate and an aromatic urethane (meth)acrylate may preferably be cited, and an aliphatic urethane (meth)acrylate may more preferably be cited.

Furthermore, the urethane (meth)acrylate is preferably a tetra- or lower-functional urethane (meth)acrylate, and more preferably a di- or lower-functional urethane (meth)acrylate.

In accordance with a urethane (meth)acrylate being contained, an ink composition having excellent adhesion to a substrate and excellent curability is obtained.

With respect to the oligomer, 'Origomar Handobukku (Oligomer Handbook)' (edited by Junji Furukawa, The Chemical Daily Co., Ltd.) may also be referred to.

As oligomer commercial products, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Ltd., and Aronix M-1100, M-1200, M-1210, M-1310, M-1600, and M-1960 manufactured by Toagosei Co., Ltd.

Examples of polyester (meth)acrylates include the EBECRYL series (e.g. EBECRY L770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

Examples of epoxy (meth)acrylates include the EBECRYL series (e.g. EBECRYL 600, 860, 2958, 3411, 3600, 3605, 3700, 3701, 3703, 3702, 3708, RDX63182, 6040, etc.) manufactured by Daicel-Cytec Company Ltd.

With regard to the oligomer, one type thereof may be used on its own or two or more types may be used in combination.

The content of the oligomer in the ink composition of the present invention is, relative to the total weight of the ink composition, preferably 0.1 to 50 wt %, more preferably 0.5 to 20 wt %, and yet more preferably 1 to 10 wt %.

Other Components

The ink composition of the present invention may comprise as necessary, in addition to the above-mentioned components, a sensitizer, a co-sensitizer, a UV absorber, an antioxidant, an antifading agent, a conductive salt, a solvent, a polymer compound, a basic compound, etc. They are described in JP-A-2009-221416 and may be used in the present invention as well.

With regard to a solvent having a boiling point of no greater than 100° C., it is preferably no greater than 1 wt % of the entire ink composition, more preferably no greater than 0.5 wt %, yet more preferably no greater than 0.1 wt %, and most preferably substantially none.

With regard to a solvent having a boiling point of greater than 100° C., it is preferably no greater than 5 wt % of the entire ink composition, more preferably no greater than 2 wt %, yet more preferably no greater than 0.5 wt %, and most preferably substantially none.

Furthermore, from the viewpoint of storage properties and suppression of head clogging, the ink composition of the present invention preferably comprises a polymerization inhibitor.

The polymerization inhibitor is preferably added at 200 to 20,000 ppm relative to the total amount of the ink composition of the present invention.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and Al cupferron.

(Properties of Ink Composition)

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium (support) is used, penetration of the ink composition into the recording medium can be prevented, and uncured monomer can be reduced. Furthermore, ink spreading when droplets of ink composition have landed can be suppressed, and as a result there is the advantage that the image quality is improved.

The surface tension of the ink composition of the present invention at 25° C. is preferably 20 to 35 mN/m, and more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

II. Inkjet Recording Method

The inkjet recording method of the present invention comprises (a) a step of forming an image onto a support by discharging the inkjet ink composition of the present invention by way of inkjet method, and, (b) a step of curing the inkjet ink composition and obtaining a printed material having a cured image on the support by irradiating the obtained image with actinic radiation. The inkjet recording method of the present invention comprises the steps (a) and (b) above and thus forms an image from the ink composition cured on the support.

In the present invention, the support is not particularly limited, and known recording medium may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink onto a support in step (a) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink composition supply tank immediately before an inkjet head, a filter, and a piezo system inkjet head. The piezo system inkjet head may be driven so as to discharge a multi-size dot of preferably 1 to 100 μL, more preferably 3 to 42 μL, and yet more preferably 8 to 30 μL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

In the present invention, since it is desirable for the ink composition to be discharged at a constant temperature, a section from the ink composition supply tank to the inkjet head is thermally insulated and heated. A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

The radiation curing type ink composition such as the ink composition of the present invention generally has a viscosity that is higher than that of a normal ink composition or a water-based ink composition used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

The curing step (b) of irradiating the image thus obtained with actinic radiation so as to cure the inkjet ink composition and obtain a printed material having the image cured on the support are explained.

The ink composition discharged onto the recording medium cures upon exposure to actinic radiation. This is due to a initiating species such as a radical being generated by decomposition of the photopolymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the photopolymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for preferably 0.01 to 120 sec., more preferably 0.01 to 90 sec., and yet more preferably 0.01 to 10 sec.

And in the present invention, it is desirable for the ink composition to be cured by irradiated for 0.01 to 10 sec. with actinic radiation and with no greater than 2,000 mW/cm2 of illumination intensity after discharging the ink composition.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

In the inkjet recording method of the present invention, it is preferable to form at least part of an image in a printed material by repeating two or more times the image formation step (a) and the curing step (b) since an image having excellent surface gloss is obtained.

Examples of the mode in which at least part of an image in a printed material is formed by repeating two or more times the image formation step (a) and the curing step (b) include a mode in which a color image is formed by carrying out the steps (a) and (b) once per color, a mode in which a single color image is formed by repeating the steps (a) and (b) two or more times for the single color image, and a mode in which a color image is formed by repeating the steps (a) and (b) two or more times for one color of the color image to form a single color image and further repeating the steps (a) and (b) two or more times in the same manner for another color of the color image.

The ink composition of the present invention preferably contains neither a silicone-based surfactant nor a fluorine-based surfactant. When repeating the steps (a) and (b) two or more times using the ink composition not containing these surfactants, these surfactants are not localized on the surface of a previously discharged ink composition liquid droplet, the fired droplet surface is kept in a liquid state for a long period of time, coalescing with a subsequently discharged ink composition liquid droplet therefore easily proceeds, and as a result the surface gloss of an image improves.

By employing such a inkjet recording method as described above, it is possible to maintain a uniform dot diameter for landed ink composition even for various types of support having different surface wettability, thereby improving the image quality. In order to obtain a color image, it is preferable to superimpose colors in order from those with a high lightness. By superimposing ink compositions in order from one with high lightness, it is easy for radiation to reach a lower ink composition, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

The inkjet recording method of the present invention may suitably employ the ink set comprising at least one ink composition of the present invention. The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In this way, the ink composition of the present invention may be cured by irradiation with actinic radiation in high sensitivity and form an image on the surface of the support.

When using as an ink set comprising plurality of ink compositions having a different color, the ink set is not particularly limited as long as it is an ink set having two or more types of ink compositions in combination, the ink set comprising in combination at least one ink composition of the present invention and another ink composition of the present invention or an ink composition other than one of the present invention, and it is preferable for the ink set to comprise at least one ink composition of the present invention having a color selected from cyan, magenta, yellow, black, white, light magenta, and light cyan.

Furthermore, the ink set of the present invention may be suitably used in the inkjet recording method of the present invention.

In order to obtain a full color image using the ink composition of the present invention, it is preferable to use, as the ink set of the present invention, an ink set comprising at least four dark ink compositions of yellow, cyan, magenta, and black, it is more preferable to use an ink set comprising in combination five dark ink compositions of yellow, cyan, magenta, black, and white and at least one ink composition of the present invention, and it is yet more preferable to use an ink set comprising in combination five dark ink compositions of yellow, cyan, magenta, black, and white and two, that is, light cyan, and light magenta ink compositions.

The 'dark ink composition' referred to in the present invention means an ink composition for which the content of the colorant exceeds 1 wt % of the entire ink composition. The colorant is not particularly limited; a known colorant may be used, and examples thereof include a pigment and a disperse dye.

The ink set of the present invention may comprise at least one dark ink composition and at least one light ink composition. The dark ink composition and the light ink composition employ colorants of similar colors, the ratio of the colorant concentration of the dark ink composition to the colorant concentration of the light ink composition is preferably dark ink composition:light ink composition=15:1 to 4:1, more preferably 12:1 to 4:1, and yet more preferably 10:1 to 4.5:1.

When the ratio is in the above-mentioned range, a vivid full color image with little feeling of grain can be obtained.

EXAMPLES

The present invention is explained below more specifically by reference to Examples and Comparative Examples. However, the present invention should not be construed as being limited by these Examples. 'Parts' in the description below means 'parts by weight' unless otherwise specified.

Materials used in the present invention are as follows.

Colorants

IRGALITE BLUE GLVO (cyan pigment, Ciba Specialty Chemicals)
CINQUASIA MAGENTA RT-335-D (magenta pigment, Ciba Specialty Chemicals)
NOVOPERM YELLOW H2G (yellow pigment, Clariant)
SPECIAL BLACK 250 (black pigment, Ciba Specialty Chemicals)
Tipaque CR60-2 (white pigment, Ishihara Sangyo Kaisha Ltd.)

Dispersants

SOLSPERSE 32000 (dispersant, Noveon)
SOLSPERSE 36000 (dispersant, Noveon)

Monomer (Component A)
V-CAP (N-vinylcaprolactam, ISP Inc.)

Polymerization Inhibitors/polymerization Initiators/surfactants

FIRSTCURE ST-1 (polymerization inhibitor, mixture of tris(N-nitroso-N-phenylhydroxyamine) aluminum salt (10 wt %) and phenoxyethyl acrylate (90 wt %), Chem First Corporation)
LUCIRIN TPO (photopolymerization initiator, 2,4,6-trimethylbenzoyldiphenylphosphine oxide, BASF)
IRGACURE 184 (photopolymerization initiator, 1-hydroxycyclohexyl phenyl ketone, Ciba Specialty Chemicals)
TEGORAD 2100 (silicone-based surfactant, Degussa)
BYK-377 (silicone-based surfactant, BYK Chemie)

Preparation of Cyan Mill Base A 300 parts of IRGALITE BLUE GLVO, 620 parts of SR9003, and 80 parts of SOLSPERSE 32000 were mixed by stirring, thus giving cyan mill base A. Preparation of cyan mill base A was carried out by dispersing using a Motor Mill M50 disperser (Eiger Machinery, Inc.) with zirconia beads having a diameter of 0.65 mm at a peripheral speed of 9 m/s for 4 hours.

Magenta mill base B, yellow mill base C, black mill base D, and white mill base E were also prepared in the same manner as for cyan mill base A using compositions and dispersion conditions shown in Table 1.

TABLE 1

| | Mill base | Cyan mill base A | Magenta mill base B | Yellow mill base C | Black mill base D | White mill base E |
|---|---|---|---|---|---|---|
| Composition (parts) | IRGALITE BLUE GLVO | 300 | — | — | — | — |
| | CINQUASIA MAGENTA RT-335D | — | 300 | — | — | — |
| | NOVOPERM YELLOW H2G | — | — | 300 | — | — |
| | SPECIAL BLACK 250 | — | — | — | 400 | — |
| | Tipaque CR60-2 | — | — | — | — | 500 |
| | SR9003 | 620 | 600 | 600 | 520 | 440 |
| | SOLSPERSE 32000 | 80 | 100 | 100 | 80 | 60 |
| Dispersion conditions | Peripheral speed (m/s) | 9 | 9 | 9 | 9 | 9 |
| | Time (hours) | 4 | 10 | 10 | 7 | 4 |

Monomers (Component B)
CD217 (4-t-butylcyclohexyl acrylate, Sartomer)
CD420 (3,3,5-trimethylcyclohexyl acrylate, Sartomer)

Monomers (Component C)
SR341 (3-methyl-1,5-pentanediol diacrylate, Sartomer)
CD406 (cyclohexanedimethanol diacrylate, Sartomer)
SR238 (1,6-hexanediol diacrylate, Sartomer)
NK Ester A-DOD-N (1,9-nonanediol diacrylate, Shin-Nakamura Chemical Co., Ltd.)
CD595 (1,10-decanediol diacrylate, Sartomer)
CD262 (1,12-dodecanediol diacrylate, Sartomer)
SD833S (tricyclodecanedimethanol diacrylate, Sartomer)
KAYARAD R-684 (dicyclopentanyl diacrylate, Nippon Kayaku Co., Ltd.)

Other Monomers
NK Ester AMP-10G (phenoxyethyl acrylate, Shin-Nakamura Chemical Co., Ltd.)
SR9003 (PO-modified neopentyl glycol diacrylate, Sartomer)
SR508 (dipropylene glycol diacrylate, Sartomer)
SR506D (isobornyl acrylate, Sartomer)
SR489 (tridecyl acrylate, Sartomer)

Oligomers
CN964 A85 (difunctional aliphatic urethane acrylate containing 15 wt % tripropylene glycol diacrylate, Sartomer)
1,4-Cyclohexanedimethanol monoacrylate (Nippon Kasei Chemical Co., Ltd.)

Examples 1 to 18 and Comparative Examples 1 to 7

Method for Preparing Ink Composition

Ink compositions of Examples 1 to 18 and Comparative Examples 1 to 7 were obtained by mixing and stirring the materials described in Table 1, including the colorant, dispersant, and monomer contained in the mill bases, and materials at the proportions shown in Table 2 and Table 3.

Inkjet Recording Method

An inkjet image was printed using a LUXELJET UV250 UV-curing type inkjet printer (Fujifilm Graphic Systems). A 100% solid image was printed on Avery Permanent 400 (polyvinyl chloride (PVC) support, Avery Dennison Corporation) at a resolution of 600×450 dpi with a size of 2 m×1 m. A lamp was equipped with a SUB ZERO 085 H bulb lamp unit manufactured by Integration Technology, and front and rear lamp intensity was set at level 5. During printing, when the exposure area illumination intensity was measured, it was found to be 980 mW/cm$^2$. Furthermore, the time from discharge until exposure was 0.2 to 0.3 sec. The amount discharged per drop was in the range of 6 to 42 μL.

This equipment carried out printing by scanning an inkjet head, opposite ends of the head were each equipped with one UV lamp, and irradiation was carried out from the two UV lamps in one head scan. A solid image was formed by alternately repeating ink droplet firing and UV irradiation with the two lamps eight times for the same position of the support.

Evaluation of Surface Gloss

Measurement was carried out for an image obtained by the above-mentioned inkjet recording method using a surface gloss meter manufactured by Sheen Instruments Ltd. at a measurement angle of 60°. The evaluation criteria were as follows. The results are shown in Table 2 and Table 3.
4: a surface gloss of at least 40
3: a surface gloss of at least 30 but less than 40
2: a surface gloss of at least 20 but less than 30
1: a surface gloss of less than 20

Evaluation of Stripe Unevenness

Stripe unevenness of an image obtained by the above-mentioned inkjet image recording method was evaluated visually from a position 2 m away from the image. The evaluation criteria were as follows. The results are shown in Table 2 and Table 3.
3: stripe unevenness could not be clearly identified visually.
2: slight stripe unevenness could be identified visually.
1: stripe unevenness could be clearly identified visually.

Evaluation of Curability

The degree of tackiness of an image obtained by the above-mentioned inkjet recording method was evaluated using the criteria below by touch. The results are shown in Table 2 and Table 3.
3: there was no tackiness on the image.
2: the image was slightly tacky, but uncured ink composition or cured film did not transfer to the hand.
1: the image was tacky, and some uncured ink composition or cured film transferred to the hand.

Evaluation of Flexibility

As a method for evaluating the flexibility of a cured film, a bending test was carried out. 100% and 200% solid images were formed by the above-mentioned inkjet recording method and evaluation was carried out using the criteria below. The results are shown in Table 2 and Table 3.
3: no cracks occurred for 100% and 200% samples.
2: no cracks occurred for the 100% sample, but cracks occurred in the bent part of an image area for the 200% sample.
1: cracks occurred in the bent part of an image area for both 100% and 200% samples.

TABLE 2

| Ink composition | | Example | | | | | | | | | | | | |
|---|---|---|---|---|---|---|---|---|---|---|---|---|---|---|
| (parts by weight) | | 1 | 2 | 3 | 4 | 5 | 6 | 7 | 8 | 9 | 10 | 11 | 12 | 13 |
| Pigment | Cyan pigment | 2.46 | — | — | — | — | 2.46 | 2.46 | 2.46 | 2.46 | 2.46 | 2.46 | 2.46 | 2.46 |
| | Magenta pigment | — | 5.40 | — | — | — | — | — | — | — | — | — | — | — |
| | Yellow pigment | — | — | 3.75 | — | — | — | — | — | — | — | — | — | — |
| | Black pigment | — | — | — | 3.60 | — | — | — | — | — | — | — | — | — |
| | White pigment | — | — | — | — | 15.00 | — | — | — | — | — | — | — | — |
| Dispersant | Solsperse 32000 | 0.66 | 1.80 | 1.25 | 0.72 | — | 0.66 | 0.66 | 0.66 | 0.66 | 0.66 | 0.66 | 0.66 | 0.66 |
| | Solsperse 36000 | — | — | — | — | 1.80 | — | — | — | — | — | — | — | — |
| Monomer (A) | N-Vinylcaprolactam | 24.78 | 22.48 | 24.48 | 24.18 | 14.45 | 8.78 | 14.78 | 35.78 | 22.78 | 24.78 | 24.78 | 24.78 | 24.78 |
| (B) | 4-t-Butyl-cyclohexyl acrylate | — | — | — | — | — | — | — | 14.00 | — | — | — | — | — |
| | 3,3,5-Trimethyl-cyclohexyl acrylate | 23.00 | 24.00 | 26.00 | 23.00 | 23.00 | 39.00 | 33.00 | — | 16.00 | 15.00 | 23.00 | 23.00 | 23.00 |
| (C) | 3-Methyl-1,5-pentanediol diacrylate | 24.00 | 23.50 | 25.00 | 23.80 | 22.00 | 24.00 | 24.00 | 22.00 | 33.00 | 11.00 | — | — | — |
| | Cyclohexanedimethanol diacrylate | — | — | — | — | — | — | — | — | — | — | — | — | 24.00 |
| | Tricyclodecanedimethanol diacrylate | — | — | — | — | — | — | — | — | — | — | — | — | — |
| | 1,6-Hexanediol diacrylate | — | — | — | — | — | — | — | — | — | — | — | — | — |
| | 1,9-Nonanediol diacrylate | — | — | — | — | — | — | — | — | — | — | — | 24.00 | — |
| | 1,10-Decanediol diacrylate | — | — | — | — | — | — | — | — | — | — | — | — | — |

TABLE 2-continued

| Ink composition | | Example | | | | | | | | | | | | |
|---|---|---|---|---|---|---|---|---|---|---|---|---|---|---|
| (parts by weight) | | 1 | 2 | 3 | 4 | 5 | 6 | 7 | 8 | 9 | 10 | 11 | 12 | 13 |
| Others | 1,12-Dodecanediol diacrylate | — | — | — | — | — | — | — | — | — | — | — | — | — |
| | Dicyclopentanyl diacrylate | — | — | — | — | — | — | — | — | — | — | — | — | — |
| | Phenoxyethyl acrylate | — | — | — | — | — | — | — | — | — | — | 11.00 | — | — |
| | PO-modified neopentyl glycol diacrylate | 5.08 | 10.80 | 7.50 | 4.68 | 13.20 | 5.08 | 5.08 | 5.08 | 5.08 | 5.08 | 5.08 | 5.08 | 5.08 |
| | Dipropylene glycol diacrylate | — | — | — | — | — | — | — | — | — | 10.00 | — | — | — |
| | Isobornyl acrylate | — | — | — | — | — | — | — | — | — | — | — | — | — |
| | Tridecyl acrylate | — | — | — | — | — | — | — | — | — | — | — | — | — |
| | 1,4-Cyclohexanedimethanol monoacrylate | — | — | — | — | — | — | — | — | — | — | — | — | — |
| Oligomer | CN964 A85 | 8.00 | 2.00 | 2.00 | 8.00 | — | 8.00 | 8.00 | 8.00 | 8.00 | 8.00 | 8.00 | 8.00 | 8.00 |
| Polymerization inhibitor | Firstcure ST-1(only Al salt) | 0.05 | 0.05 | 0.05 | 0.05 | 0.05 | 0.05 | 0.05 | 0.05 | 0.05 | 0.05 | 0.05 | 0.05 | 0.05 |
| Polymerization initiator | Irgacure 184 | 3.47 | 1.47 | 1.47 | 3.47 | 2.50 | 3.47 | 3.47 | 3.47 | 3.47 | 3.47 | 3.47 | 3.47 | 3.47 |
| | Lucirin TPO | 8.50 | 8.50 | 8.50 | 8.50 | 8.00 | 8.50 | 8.50 | 8.50 | 8.50 | 8.50 | 8.50 | 8.50 | 8.50 |
| Surfactant | Tegorad 2100 | — | — | — | — | — | — | — | — | — | — | — | — | — |
| | BYK 377 | — | — | — | — | — | — | — | — | — | — | — | — | — |
| Total | | 100 | 100 | 100 | 100 | 100 | 100 | 100 | 100 | 100 | 100 | 100 | 100 | 100 |
| Sum total of Components (B) and (C) | | 47 | 47.5 | 51 | 46.8 | 45 | 63 | 57 | 36 | 49 | 26 | 47 | 47 | 47 |
| Performance evaluation results | Surface gloss | 4 | 4 | 4 | 4 | 4 | 2 | 4 | 3 | 4 | 3 | 4 | 3 | 4 |
| | Stripe unevenness | 3 | 3 | 3 | 3 | 3 | 3 | 3 | 3 | 3 | 2 | 3 | 3 | 3 |
| | Curability | 3 | 3 | 3 | 3 | 3 | 3 | 3 | 3 | 3 | 3 | 3 | 3 | 3 |
| | Flexibility | 3 | 3 | 3 | 3 | 3 | 3 | 3 | 3 | 2 | 3 | 3 | 2 | 3 |

TABLE 3

| Ink composition | | Example | | | | | Comparative Example | | | | | | |
|---|---|---|---|---|---|---|---|---|---|---|---|---|---|
| (parts by weight) | | 14 | 15 | 16 | 17 | 18 | 1 | 2 | 3 | 4 | 5 | 6 | 7 |
| Pigment | Cyan pigment | 2.46 | 2.46 | 2.46 | 2.46 | 2.46 | 2.46 | 2.46 | 2.46 | 2.46 | 2.46 | 2.46 | 2.46 |
| | Magenta pigment | — | — | — | — | — | — | — | — | — | — | — | — |
| | Yellow pigment | — | — | — | — | — | — | — | — | — | — | — | — |
| | Black pigment | — | — | — | — | — | — | — | — | — | — | — | — |
| | White pigment | — | — | — | — | — | — | — | — | — | — | — | — |

TABLE 3-continued

| Ink composition (parts by weight) | | | Example | | | | | Comparative Example | | | | | | |
|---|---|---|---|---|---|---|---|---|---|---|---|---|---|---|
| | | | 14 | 15 | 16 | 17 | 18 | 1 | 2 | 3 | 4 | 5 | 6 | 7 |
| Dispersant | | Solsperse 32000 | 0.66 | 0.66 | 0.66 | 0.66 | 0.66 | 0.66 | 0.66 | 0.66 | 0.66 | 0.66 | 0.66 | 0.66 |
| | | Solsperse 36000 | — | — | — | — | — | — | — | — | — | — | — | — |
| Monomer | (A) | N-Vinylcaprolactam | 24.78 | 24.78 | 24.78 | 24.78 | 24.78 | — | 24.00 | 24.00 | 24.00 | 22.08 | 5.00 | 9.78 |
| | (B) | 4-t-Butylcyclohexyl acrylate | — | — | — | — | — | — | — | — | — | — | — | — |
| | | 3,3,5-Trimethylcyclohexyl acrylate | 23.00 | 23.00 | 23.00 | 23.00 | 23.00 | — | — | — | — | — | — | — |
| | (C) | 3-Methyl-1,5-pentanediol diacrylate | — | — | 15.00 | — | — | 46.00 | — | — | — | — | — | — |
| | | Cyclohexanedimethanol diacrylate | — | 16.00 | 9.00 | — | — | — | — | — | — | — | — | — |
| | | Tricyclodecanedimethanol diacrylate | — | 8.00 | — | — | — | — | — | — | — | — | — | — |
| | | 1,6-Hexanediol diacrylate | — | — | — | — | — | — | — | — | 25.50 | — | 8.00 | — |
| | | 1,9-Nonanediol diacrylate | — | — | — | — | — | — | 21.90 | — | — | — | — | — |
| | | 1,10-Decanediol diacrylate | 24.00 | — | — | 23.95 | 23.90 | — | — | — | — | — | — | — |
| | | 1,12-Dodecanediol diacrylate | — | — | — | — | — | — | — | — | — | — | — | — |
| | | Dicyclopentanyl diacrylate | — | — | — | — | — | — | — | — | — | — | — | 10.00 |
| | Others | Phenoxyethyl acrylate | — | — | — | — | — | 25.78 | 10.08 | 18.22 | — | — | 4.78 | 20.00 |
| | | PO-modified neopentyl glycol diacrylate | 5.08 | 5.08 | 5.08 | 5.08 | 5.08 | 5.08 | 5.08 | 5.08 | 5.08 | 5.08 | 5.08 | 5.08 |
| | | Dipropylene glycol diacrylate | — | — | — | — | — | — | 15.80 | 29.56 | — | 12.70 | — | — |
| | | Isobornyl acrylate | — | — | — | — | — | — | — | — | 21.98 | — | 20.00 | 30.00 |
| | | Tridecyl acrylate | — | — | — | — | — | — | — | — | — | 37.00 | 24.00 | — |
| | | 1,4-Cyclohexanedimethanol monoacrylate | — | — | — | — | — | — | — | — | — | — | — | 10.00 |
| Oligomer | | CN964 A85 | 8.00 | 8.00 | 8.00 | 8.00 | 8.00 | 8.00 | 8.00 | 8.00 | 8.00 | 8.00 | 18.00 | — |
| Polymerization inhibitor | | Firstcure ST-1 (only Al salt) | 0.05 | 0.05 | 0.05 | 0.05 | 0.05 | 0.05 | 0.05 | 0.05 | 0.05 | 0.05 | 0.05 | 0.05 |
| Polymerization initiator | | Irgacure 184 | 3.47 | 3.47 | 3.47 | 3.47 | 3.47 | 3.47 | 3.47 | 3.47 | 3.47 | 3.47 | 3.47 | 3.47 |
| | | Lucirin TPO | 8.50 | 8.50 | 8.50 | 8.50 | 8.50 | 8.50 | 8.50 | 8.50 | 8.50 | 8.50 | 8.50 | 8.50 |
| Surfactant | | Tegorad 2100 | — | — | — | 0.05 | 0.10 | — | 0.05 | — | — | — | — | — |
| | | BYK 377 | — | — | — | — | — | — | — | — | — | 0.30 | — | — |
| | | Total | 100 | 100 | 100 | 100 | 100 | 100 | 100.1 | 100 | 100 | 100 | 100 | 100 |

TABLE 3-continued

| Ink composition (parts by weight) | | Example | | | | | Comparative Example | | | | | | |
|---|---|---|---|---|---|---|---|---|---|---|---|---|---|
| | | 14 | 15 | 16 | 17 | 18 | 1 | 2 | 3 | 4 | 5 | 6 | 7 |
| Sum total of components (B) and (C) | | 47 | 47 | 47 | 46.95 | 46.9 | 46 | 21.9 | 0 | 25.5 | 0 | 8 | 10 |
| Performance evolution results | Surface gloss | 4 | 3 | 4 | 3 | 2 | 2 | 2 | 1 | 1 | 1 | 2 | 2 |
| | Stripe unevenness | 3 | 3 | 3 | 3 | 3 | 1 | 2 | 1 | 1 | 1 | 1 | 2 |
| | Curability | 3 | 3 | 3 | 3 | 3 | 1 | 3 | 3 | 3 | 3 | 1 | 1 |
| | Flexibility | 3 | 3 | 3 | 3 | 3 | 2 | 2 | 3 | 2 | 3 | 3 | 3 |

What is claimed is:

1. An inkjet ink composition comprising:
   (Component A) an N-vinyllactam;
   (Component B) a compound represented by Formula (B); and
   (Component C) a di(meth)acrylate ester of a hydrocarbon diol having 6 to 18 carbon atoms, wherein Component (C) comprises (Component C-2) a di(meth)acrylate ester of a branched hydrocarbon diol having 6 to 18 carbon atoms,

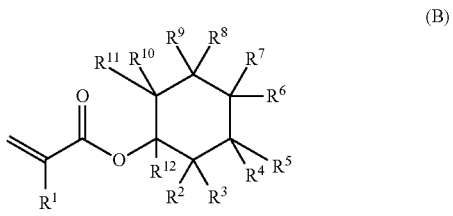

(B)

wherein $R^1$ denotes a hydrogen atom or a methyl group, and $R^2$ to $R^{12}$ independently denote a hydrogen atom or an alkyl group having 1 to 10 carbon atoms.

2. The inkjet ink composition according to claim 1, wherein it comprises an α-hydroxy ketone compound and/or a monoacylphosphine oxide compound as (Component D) a polymerization initiator.

3. The inkjet ink composition according to claim 1, wherein Component A above is N-vinylcaprolactam.

4. The inkjet ink composition according to claim 1, wherein Component A above has a content of at least 8 wt % but no greater than 40 wt % relative to the total weight of the ink composition.

5. The inkjet ink composition according to claim 1, wherein Component B above is 4-t-butylcyclohexyl (meth)acrylate and/or 3,3,5-trimethylcyclohexyl (meth)acrylate.

6. The inkjet ink composition according to claim 1, wherein Component B above has a content of at least 10 wt % but no greater than 45 wt % relative to the total weight of the ink composition.

7. The inkjet ink composition according to claim 1, wherein the hydrocarbon diol is at least one type of diol selected from the group consisting of a straight-chain hydrocarbon diol having 9 to 18 carbon atoms, a branched hydrocarbon diol having 6 to 18 carbon atoms, and a cyclic hydrocarbon diol having 6 to 18 carbon atoms.

8. The inkjet ink composition according to claim 1, wherein Component C above has a content of at least 10 wt % but no greater than 45 wt % relative to the total weight of the ink composition.

9. The inkjet ink composition according to claim 1, wherein it comprises neither a silicone-based surfactant nor a fluorine-based surfactant or comprises a total content of silicone-based and fluorine-based surfactants of greater than 0 wt % but no greater than 0.01 wt % relative to the total weight of the ink composition.

10. The inkjet ink composition according to claim 1, wherein of ethylenically unsaturated compounds contained in the ink composition, at least 70 wt % are compounds having no ether bond.

11. The inkjet ink composition according to claim 1, wherein Component A above is an N-vinyllactam represented by Formula (A)

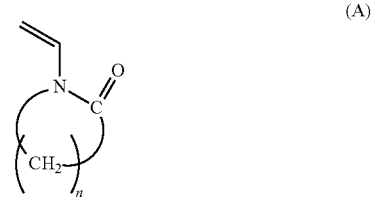

(A)

wherein n denotes an integer of 2 to 6.

12. The inkjet ink composition according to claim 1, wherein Component A above is N-vinylcaprolactam, and
   Component B above is 4-t-butylcyclohexyl (meth)acrylate and/or 3,3,5-trimethylcyclohexyl (meth)acrylate.

13. The inkjet ink composition according to claim 12, wherein the sum total of the contents of Component B above and Component C above is at least 25 wt % but no greater than 75 wt % relative to the total weight of the ink composition.

14. The inkjet ink composition according to claim 12, wherein it comprises an α-hydroxyketone compound and/or a monoacylphosphine oxide compound as (Component D) a polymerization initiator.

15. The inkjet ink composition according to claim 1, wherein Component A above is N-vinylcaprolactam,
   Component B above is 4-t-butylcyclohexyl (meth)acrylate and/or 3,3,5-trimethylcyclohexyl (meth)acrylate, and
   the ink composition comprises neither a silicone-based surfactant nor a fluorine-based surfactant or comprises a total content of silicone-based and fluorine-based surfactants of greater than 0 wt % but no greater than 0.1 wt % relative to the total weight of the ink composition.

16. An inkjet recording method comprising:
   (a) an image formation step of forming an image above a support by discharging the inkjet ink composition according to claim 1 by an inkjet method; and
   (b) a curing step of curing the inkjet ink composition by irradiating the obtained image with actinic radiation to thus obtain a printed material having a cured image above the support.

17. The inkjet recording method according to claim 16, wherein at least part of the image in the printed material is formed by repeating the image formation step and the curing step two or more times.

18. The inkjet ink composition according to claim 1, wherein Component A has a content of at least 8 wt % but no greater than 40 wt % relative to the total weight of the ink composition, Component B has a content of at least 10 wt % but no greater than 45 wt % relative to the total weight of the ink composition, and Component C has a content of at least 10 wt % but no greater than 45 wt % relative to the total weight of the ink composition.

19. The inkjet ink composition according to claim 1, wherein Component C comprises 3-methyl-1,5-pentanediol diacrylate as Component C-2.

20. The inkjet ink composition according to claim 19, wherein Component A has a content of at least 8 wt% but no greater than 40 wt% relative to the total weight of the ink composition, Component B has a content of at least 10 wt % but no greater than 45 wt % relative to the total weight of the ink composition, and Component C has a content of at least 10 wt % but no greater than 45 wt % relative to the total weight of the ink composition.

* * * * *